Inventor
Alexander M. Hutcheson
By Scrivener and Parker,
Attorneys

United States Patent Office 2,944,670
Patented July 12, 1960

2,944,670

MEANS FOR ACCELERATING THE SEPARATION OF WATER AND SOLID IMPURITIES FROM LIQUID FUEL FOR AIRCRAFT

Alexander M. Hutcheson, Codsall, England, assignor to Thompson Brothers (Bilston) Limited, Bilston, England Filed Feb. 20, 1958, Ser. No. 716,452

Claims priority, application Great Britain Mar. 4, 1957

2 Claims. (Cl. 210—152)

This invention relates to means for accelerating the separation of water and solid impurities from liquid fuel for aircraft.

It is well known that with liquid fuels contaminated with water, the separation of the water and impurities from the fuel will take place by gravitation providing the contaminated fuel is allowed to stand undisturbed for a sufficient time which will vary for different fuels depending upon their viscosity, specific gravity, natural facial tension and distillation characteristics, the heavier fuels, such for example as jet fuel or kerosine, generally requiring a longer standing time than the lighter fuels such as aviation petrol. It is also known that whereas a large proportion of the water contamination will separate out readily and fairly quickly, say in ten minutes, from contaminated kerosine, a smaller though yet considerable proportion of the water contamination in fine droplet form remains in suspension for a considerably longer time. The uncontaminated kerosine or other liquid fuel may contain water, say of the order of 0.006%, which remains actually dissolved in the fuel and cannot be removed by gravitation.

The present invention has for its object the provision of means, for use in association with a mobile tanker or a static hydrant plant for fuelling aircraft, whereby the separation of contamination water (that is to say the "free" or readily separable water particles and also the water particles in suspension) together with solid particles in suspension can be accelerated so that the water and dirt contamination can be reduced to an acceptable or safe standard and the fuelling operation expedited.

According to the present invention, there is provided for use in association with a mobile tanker or a static hydrant plant for fuelling aircraft and comprising a fuelling tank with a discharging system, including the usual pump, pressure control valve, one or more micro filters and an air separator, an auxiliary tank and one or more banks of cyclones through which the fuel can be passed or circulated prior to being discharged from the fuelling tank into the aircraft, said auxiliary tank serving as a collection tank into which the contamination water and dirt separated out by the cyclones is received and from which it can be drained from time to time as required.

The invention will now be more fully described with reference to and by the aid of the accompanying drawings, in which.

Figure 1:
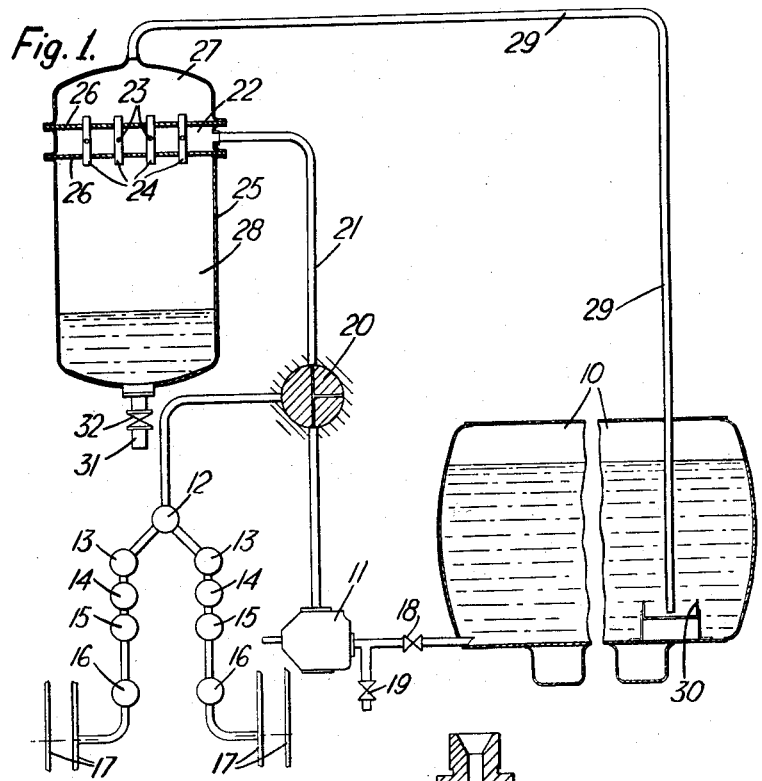
Fig. 1 is a diagrammatic view of an aircraft fuelling plant.

Referring to the drawings, and more particularly to Fig. 1, the fuelling plant comprises the usual fuelling tank 10 and associated discharging system including a pump 11, pressure control valve 12 and branches each including a filter 13, an air separator 14, a flow meter 15 and a valve 16 which controls the delivery to fuelling hose (not shown) on a reel 17. A shut-off valve 18 is included in the draw-off pipe connecting the fuelling tank 10 to the pump 11, and between said valve 18 and pump 11 a branch under the control of a shut-off valve 19 is connected a supply pipe for connection to bulk supply for filling the fuelling tank 10.

The pump delivery to the pressure control valve 12 and associated branches is under the control of a three-way valve 20 whereby the delivery to the pressure control valve 12 can be cut-off, as shown, and directed by a pipe line 21 into a chamber 22 which is common to the inlets 23 of a bank of cyclones 24, said chamber 22 being afforded in an auxiliary tank 25 by partition plates 26 which jointly carry said cyclones 24 with their upper ends or overflows discharging into a compartment 27 above the upper partition plate 26 and with their lower outlets discharging into a compartment 28 below the lower partition 26. The compartment 27 of the auxiliary tank 25 is connected to a pipe line 29 which discharges into an overflow "well" 30 in the bottom of the fuelling tank 10 and at that end remote from the draw-off pipe inlet, whilst the bottom of the compartment 28 has a drainage outlet 31 controlled by a shut-off valve 32.

Figure 2:
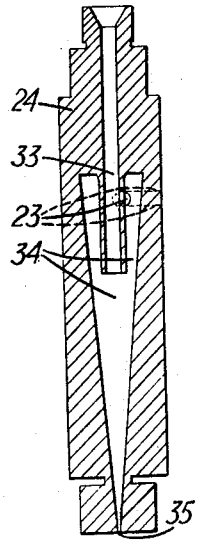
Fig. 2 is a diametrical section of one of the cyclones.

The cyclones 24 are preferably of the form shown in Fig. 2 with a tangential inlet 23 leading into an annular space about an overflow pipe 33 which depends into the upper part of a conical separation chamber 34 and with a fine bore outlet 35 at the base for the contamination water and dirt separated out from the fuel. Preferably also the cyclones will be made of or lined with a water repellant material to assist in the cyclonic separation by reducing friction between water droplets and the wall of the cyclone and between such droplets and the liquid fuel passing through the cyclone to the overflow.

The contaminated fuel is preferably passed through the cyclones 24 when the fuelling tank 10 is being filled up, and it is subsequently circulated by way of the cyclones once or twice, or even more times should it be necessary, in order to remove water and dirt to an acceptable level. In order that the bulk of liquid can be passed through the cyclones 24 in a short time, say ten minutes, there would be a large number of cyclones 24, say for example approximately 230 cyclones arranged in parallel in two banks to permit a through-put of 300 gallons per minute from a 3000 gallon main tank 10, the associated auxiliary tank 25 into which the water and dirt is delivered by the cyclones 24 being, say, of about 250 gallon capacity and preferably provided with an inspection window. Also the auxiliary tank 25 may have a downwardly tapering section and be provided with an internal lining or coating of an appropriate water repellant material to facilitate flow down to a drainage outlet 31.

When filling the fuelling tank 10 by way of the pump 11 and the cyclones 24, a shut-off valve 18 in the draw-off pipe from the fuelling tank 10 would be closed, the valve 20 would be in the position shown closing the discharge line to the pressure control valve 12 and connecting the pump delivery to the inlet chamber 22 which is common to all the cyclones 24, and valve 19 would be opened to connect the pump inlet to the filling or bulk supply point. When recirculating the fuel from the fuelling tank 10 through the cyclones 24, the filling line would be closed by a valve 19, the draw-off pipe shut-off valve 18 would be open, and the valve 20 would remain in the position shown. When fuelling an aircraft, the draw-off shut-off valve 18 would be opened, as would also the pressure control valve 12 and one or both valves 16 controlling the metered fuel, whilst the valve 20 would be turned to the position in which it cuts off delivery to the cyclones 24 via the chamber 22 and connects the pump delivery to the pressure control valve 12 and branch discharge lines.

It will, of course, be obvious that the cyclonic removal of contamination water and dirt to an acceptable level before fuelling will remove a considerable load from the filters in the fuelling system.

After fuelling, the contamination water and dirt removed from the fuel would be drained off from the auxiliary tank 25, and after this has been done, any fuel remaining in the auxiliary tank 25 may be recirculated through the cyclones 24 into the fuelling tank 10 say by connecting the drainage outlet 31 by a pipe and the valve 19 to the inlet side of the pump 11.

In applying the invention to a mobile tanker, the auxiliary tank 25 may be afforded by partitioning off an appropriate portion of the fuelling tank 10, or by a separately formed tank mounted on the same chassis. Alternatively, the auxiliary or collection tank 25 with the associated bank or banks of cyclones 24 may be mounted on a separate chassis, constituting an independent mobile cyclone unit, adapted to be coupled by flexible pipes to any of a number of mobile tankers.

Having fully described my invention, what I claim and desire to secure by Letters Patent is:

1. A fuel purifying and delivery system for aircraft comprising a fuel supply tank, an auxiliary tank, a delivery line for delivering fuel to an aircraft, a pump having an inlet side connected to said supply tank and an outlet side connected to said delivery line and to said auxiliary tank, a three-way valve in the connection between said pump outlet and said delivery line and said auxiliary tank and movable to a first position for connecting said pump outlet to said auxiliary tank and movable to a second position for connecting said pump outlet to said delivery line, means dividing said auxiliary tank into three compartments, one of said compartments being at all times in communication with said pump outlet when said valve is in its first position, impurity separating means in said auxiliary tank, said last named means having an inlet in the compartment communicating with the pump outlet and having a purified fuel outlet connected to a second of said compartments and an impurity outlet connected to the third of said compartments, conduit means connecting the purified fuel compartment with said supply tank, and drain means affording a connection between the impurity compartment and waste, said pump continuously circulating said fuel between said supply and auxiliary tanks so as to continuously subject said fuel to purification except when the position of said three-way valve is changed to cut off the connection between said pump outlet and said auxiliary tank and open the connection between said outlet and said delivery line.

2. The system of claim 1 wherein the impurity separating means comprise at least one bank of cyclones in parallel and wherein the first compartment is intermediate the second and third compartments, the inlets of said cyclones being in said intermediate compartments and the outlets communicating respectively with said second and third compartments.

References Cited in the file of this patent

UNITED STATES PATENTS

| | | |
|---|---|---|
| 1,973,607 | Bunn | Sept. 11, 1934 |
| 2,259,771 | Oberly | Oct. 21, 1941 |
| 2,765,918 | Fontein | Oct. 9, 1956 |